United States Patent [19]

Jüptner et al.

[11] Patent Number: 4,768,881
[45] Date of Patent: Sep. 6, 1988

[54] METHOD AND APPARATUS FOR PROCESSING HOLOGRAPHIC INTERFERENCE PATTERNS USING FOURIER-TRANSFORMS

[76] Inventors: Werner P. O. Jüptner; Thomas M. Kreis, both of Ermlandstrasse 59, D-2820 Bremen 71, Fed. Rep. of Germany

[21] Appl. No.: 54,692

[22] Filed: May 27, 1987

[51] Int. Cl.⁴ .............................................. G01B 9/023
[52] U.S. Cl. .................................... 356/347; 250/550; 356/359; 364/525
[58] Field of Search ................ 250/550; 356/347, 348, 356/354, 359, 360; 364/525, 576

[56] References Cited

U.S. PATENT DOCUMENTS 3,874,796  4/1975  Chovan et al. ................ 356/359
4,690,552  9/1987  Grant et al. .................. 356/353 X Primary Examiner—Davis L. Willis
Assistant Examiner—Matthew W. Koren
Attorney, Agent, or Firm—Sughrue, Mion, Zinn, Macpeak, and Seas

[57] ABSTRACT

A method for accurate phase determination in holographic interferometry using a one- to two-dimensional Fourier transform is described. The method calculates the interference phase pointwise, even between fringe extrema, and thus has advantages over conventional fringe-finding and -tracking methods. Only one interference pattern may be used, although the use of two patterns reconstructed with a mutual phase shift permits an easier phase unwrapping and determination of non-monotonic fringe-order variations. Additionally, the method offers a means for filtering out disturbances such as speckle noise and background variations.

19 Claims, 8 Drawing Sheets

METHOD AND APPARATUS FOR PROCESSING HOLOGRAPHIC INTERFERENCE PATTERNS USING FOURIER-TRANSFORMS

BACKGROUND OF THE INVENTION

The present invention relates to a method and apparatus for processing holographic interference patterns using Fourier transforms.

Numerous methods have been suggested for the processing of holographic interference patterns. These methods are briefly discussed and appropriate cross-reference is made to materials listed in the bibliography section of the application.

Measurements of deformation fields by holographic interferometry require the determination of interference phase from the fringe patterns. From the phase distribution together with the sensitivity vectors, which are given by the geometrical arrangement of the optical components, the displacement vectors and thus the deformations are determined.[1-2, 16-17] Every quantitative measurement using holographic interferometry has to take into account the speckle noise and nonuniform background-intensity variations. The accurate measurements needed for strain and stress analysis require the determination of the interference phase, even between the fringe maxima and minima. This may be achieved by numerical interpolation after locating the centers of dark and bright fringes.[3] More precise results are obtained by the evaluation of three or four interferograms reconstructed with mutual phase shifts in the reference wave.[4-8] The phase shifts may be performed during real time reconstruction[5-7] or by the double-exposure technique with the application of two-reference-beam holography.[4,8] If the phase shift has a known value, three reconstructions suffice,[7,8] but the use of four reconstructions with an unknown but constant value, offers advantages in error-reduction capability.[4-6]

Nonlinear regression analysis has been proposed for determining the phase distribution from one distributed intensity distribution of a holographic interferogram along one line.[9] Since each individual irradiance measurement carries information about the interference phase at its position, this method uses all information available to smooth and interpolate the phase of the fringes.

Automated holographic interference fringe evaluation normally uses digital image-processing methods.[3,5,6,10,11] The intensities of the fringe pattern are recorded by a vidicon or charge-coupled-device camera along a rectangular array of pixels and are quantized to discrete values normally ranging from 0 to 255, corresponding to 8 bits.

Although the above methods represent notable developments in the art of holographic interferometry, further developments and improvements are desired.

SUMMARY OF THE INVENTION

The object of the present invention is to provide a unique method and apparatus supplying these further developments and improvements.

A Fourier-transform method to determine one phase distribution from one holographic interferogram is described, taking into account all available intensities from all pixels of the recorded pattern. Furthermore, procedures for detecting sign changes and unwrapping the $2\pi$ discontinuities are presented, one based on the assumption of a continuous phase and the other on using two phase-shifted reconstructions. A restoration of the patterns degraded by speckle noise and background variation inherently performed during evaluation is described.

This Fourier-transform method in a way resembles a method proposed to evaluate conventional interferograms.[12-14] In that method a high spatial-carrier frequency has to be introduced by tilting the wave front during measurement. No such modification in the holographic interometric process is needed for the method of the present invention.

These and other objects and advantages of the invention will become more fully apparent from the following description made in connection with the accompanying drawings, wherein:

BRIEF DESCRIPTION OF THE DRAWINGS

FIG. 2a—intensity distribution;
FIG. 2b—amplitude spectrum;
FIG. 2c—amplitude spectrum after bandpass filtering;
FIG. 2d—interference phase modulo $2\pi$.

FIGS. 3a-3 are diagrams showing the following various stages in an example of interference phase determination further using image enhancement by filtering:
FIG. 3a—intensity distribution.

FIG. 4a—nonmonotonic phase distribution;
FIG. 4b—intensity distribution;
FIG. 4c—amplitude spectrum;
FIG. 4d—filtered amplitude spectrum;
FIG. 4e—interference phase modulo $2\pi$;
FIG. 4f—continuous interference phase.

FIG. 5a—intensity distribution;
FIG. 5b—interference phase modulo $2\pi$;
FIG. 5c—continuous interference phase;
FIG. 5d—phase shift calculated from FIGS. 4b and 5a;
FIG. 5e—sign corrected phase modulo $2\pi$;
FIG. 5f—sign corrected continuous interference phase.

FIG. 9a illustrates the interference-phase distribution modulo $2\pi$ of the interferogram of FIG. 6, determined with the bandpass filter of FIG. 8a.

DETAILED DESCRIPTION OF THE PREFERRED EMBODIMENTS

Figure 11:
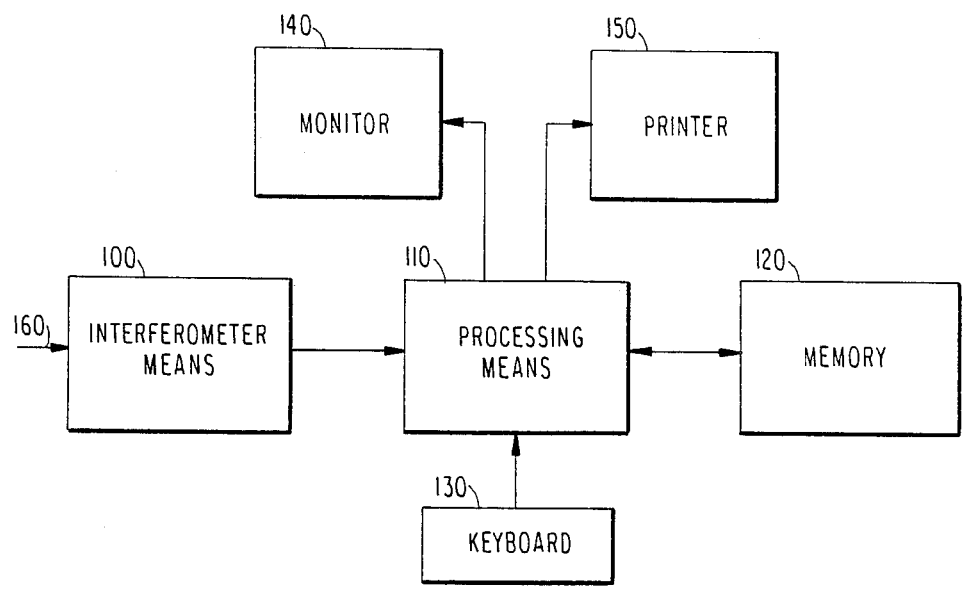
FIG. 11 is a simplified block diagram of a system providing the processing of the holographic interference patterns.

FIG. 11 is a simplified block diagram of a system providing the processing of the holographic interference patterns. Interferometer means 100 receives interference pattern data at its input 160, and provides the data to the processing means 110. Support memory 120 provides a location where the interference pattern data can be stored or, alternatively, stores instructions and programs to control the processing of the interference pattern data. Keyboard 130 provides a means for manually inputting instructions to be stored in memory 120, or for controlling the processing of the data by the processing means. Processing means 110 processes the interference pattern data in accordance with the instructions from the memory 120 or keyboard 130, and produces an appropriate display of the processed data on the monitor 140 or the printer 150.

The processing steps of the present invention will now be described.

The measured intensity distribution i(x, y) may be written in the form $$i(x, y) = a(x, y) + b(x, y) \cos [\phi(x, y)] \quad (1)$$

where a(x,y) describes the background variation and b(x,y) is related to the local contrast of the pattern. Generally speaking, a(x, y) and b(x, y) carry the additive and the multiplicative disturbances, respectively, and $\phi(x, y)$ is the interference phase to be determined from i(x, y).

Here one has to consider the fact that the cosine is a periodic and even function.[18] Thus every phase calculated from one intensity distribution in the form of Eq. (1) is indefinite to an additive integer multiple of $2\pi$ and to the sign $$\cos \phi = \cos (s\phi + 2\pi n), n \in \mathbb{Z}, s \in \{-1, +1\}. \quad (2)$$

Figure 1:
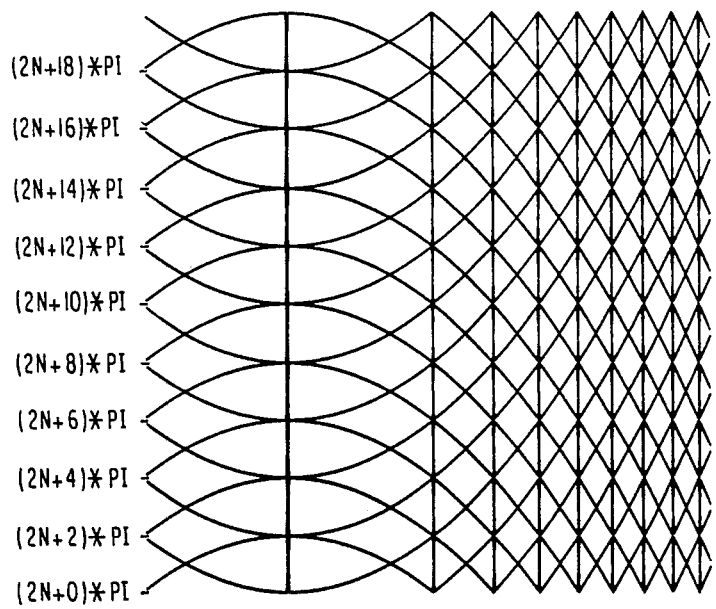
FIG. 1 is a diagram showing a set of phase distributions stemming from the same intensity distribution in holographic interferometry.

Every path through the graph (part of which is shown in FIG. 1) represents one phase distribution leading to the intensity distribution shown below the graph.

Phase Determination by Fourier-Transform Method

The fringe-pattern formula, Eq. (1), can be rewritten as $$i(x, y) = a(x, y) + c(x, y) + c^*(x, y), \quad (3)$$

where $$c(x, y) = \tfrac{1}{2} b(x, y) \exp [j\phi(x, y)], \quad (4)$$

with $j = \sqrt{-1}$ and * denoting the complex conjugate.

Next, Eq. (3) is Fourier transformed, which may be done one-dimensionally with respect to x, giving $$I(u, y) = A(u, y) + C(u, y) + C^*(u, y); \quad (5a)$$

one-dimensionally with respect to y, giving $$I(x, v) = A(x, v) + C(x, v) + C^*(x, v) \quad (5b)$$

or two-dimensionally with the result $$I(u, v) = A(u, v) + C(u, v) + C^*(u, v). \quad (5c)$$

Figure 2A:
FIGS. 2a-d are diagrams showing the following various stages in an example of interference phase determination.
Figure 2A:
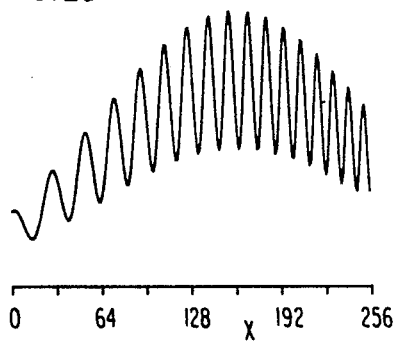
Figure 2B:
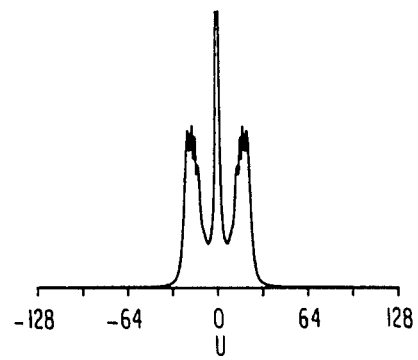
Figure 2C:
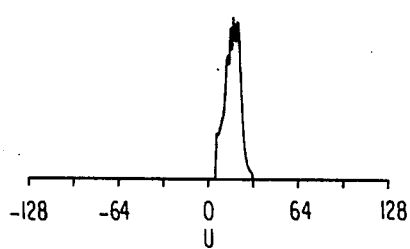
Figure 2D:
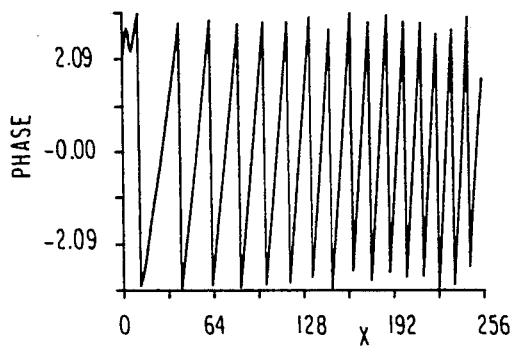

Assuming that the background intensity is slowly varying compared with the fringe spacing, the amplitude spectrum will be a trimodal function with A broadening the zero peak and C and C* placed symmetrically to the origin. This is shown in FIG. 2b, which is the Fourier-transform of the intensity distribution of FIG. 2a. Next, one of the two symmetrical parts, say C*, as well as the broadened zero peak, is filtered out. The removal of one of the symmetric ports in the spatial frequency domain may be considered as the application of a bandpass filter. FIG. 2c shows the filtered version of the spectrum. This remaining spectrum is no longer symmetrical; thus it does not not belong to a real function in the spatial domain but yields nonzero imaginary parts after inverse transformation. By applying the inverse Fourier transform, c(x, y) is obtained. From c(x, y) the interference phase is calculated pointwise by $$\phi(x,y) = \arctan \frac{Im[c(x,y)]}{Re[c(x,y)]} \quad (6)$$

where Re denotes the real part and Im the imaginary part. To obtain the result shown in FIG. 2d, the signs of the numerator and the denominator in Eq. (6) must be taken into account separately, thus leading to values ranging from $-\pi$ to $+\pi$.

Image Enhancement by Digital Filtering

Although the main reason for application of the non-symmetrical filter in the spatial domain is to get a complex function c(x, y) in the spatial domain, digital filtering may be used for an enhancement of the interference of the interference pattern. By adjustment of the spatial cutoff frequencies, one can filter out low-frequency background variations, high-frequency speckle noise, and other disturbances that lead to spatial-frequency components not expected in the interferogram.

Figure 3A:
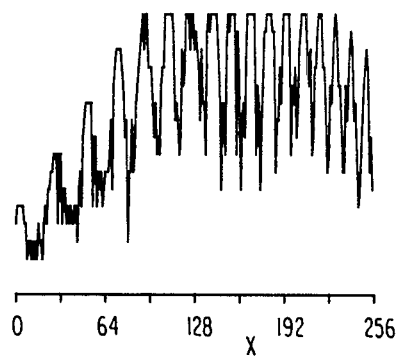
Figure 3B:
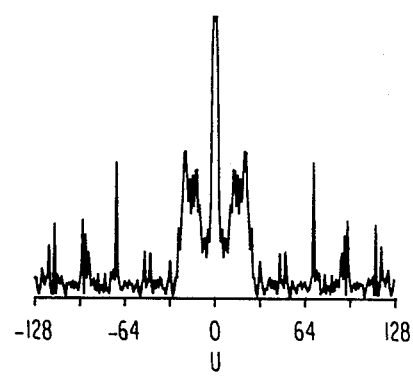
FIG. 3b—amplitude spectrum.
Figure 3C:
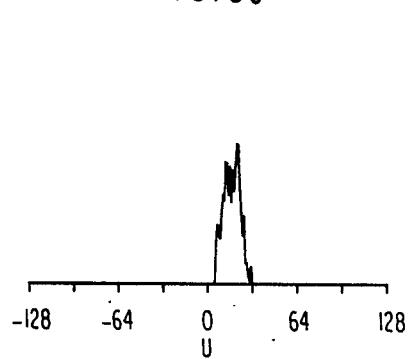
FIG. 3c—filtered amplitude spectrum.
Figure 3D:
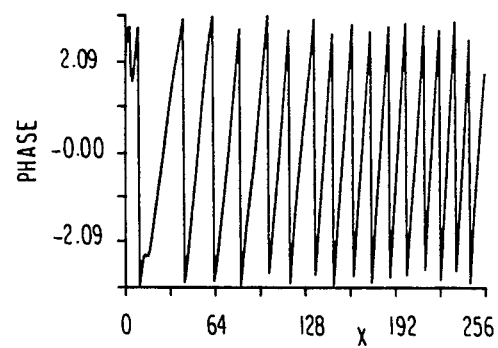
FIG. 3d—interference phase modulo $2\pi$.
Figure 3E:
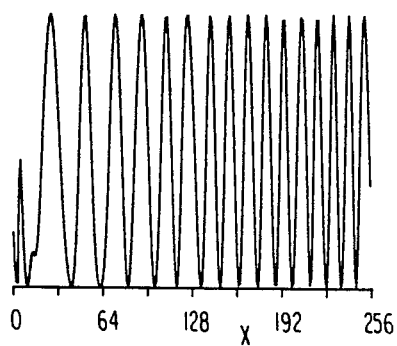
FIG. 3e—intensity distribution according to the phase of d.

For demonstration, an intensity distribution, suffering from Gaussian background variation, speckle noise, reduced quantization into 16 gray levels, and nonlinear response with a saturation effect, was simulated (FIG. 3a). The corresponding Fourier spectrum is shown in FIG. 3b, and that, after filtering, in FIG. 3c. The phase distribution calculated by Eq. (6) is displayed in FIG. 3d. To compare the result of the filtering, the cosine of the phase is taken, yielding the intensity distribution of FIG. 3e, which corresponds to the noisy intensity of FIG. 3a. The enhancement achieved is clear.

Phase Unwrapping

In many holographic applications the direction of deformation is predetermined by the type of loading. If one assumes a monotonically increasing phase distribution $\phi(x)$, an easy way to convert the discontinuous phase to a continuous one can be based on the fact that the sampling theorem demands at least two pixels per fringe. So the phase difference between two adjacent pixels must be less than $\pi$. This permits phase unwrapping in the one-dimensional case by the recurrence procedure along the x coordinate:

$$n(x_1) = 0, \quad (7)$$

$$n(x_i) = \begin{cases} n(x_{i-1}) & \text{if } |\phi(x_i) - \phi(x_{i-1})| < \pi \\ n_{(i-1)} + 1 & \text{if } |\phi(x_i) - \phi(x_{i-1})| \leq -\pi, \\ & i = 2, 3, \ldots, \end{cases}$$

$$\phi_{contin}(x_i) = \phi(x_i) + 2\pi n(x_i), i = 1, 2, \ldots$$

Figure 4A:
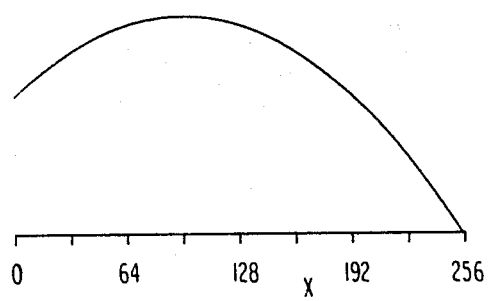
FIGS. 4a-f are diagrams showing the following stages in another example of interference phase determination.
Figure 4B:
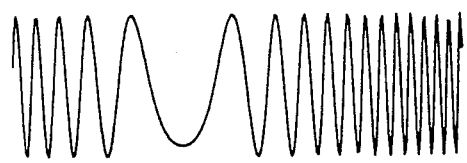
Figure 4C:
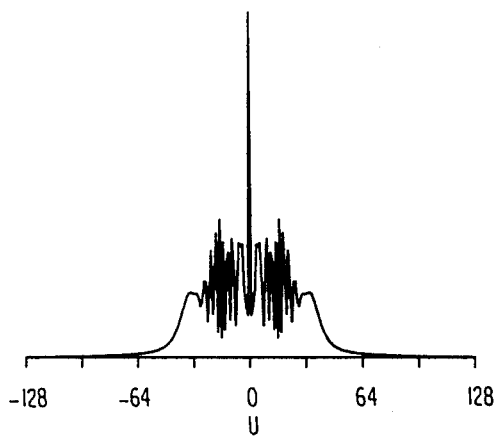
Figure 4D:
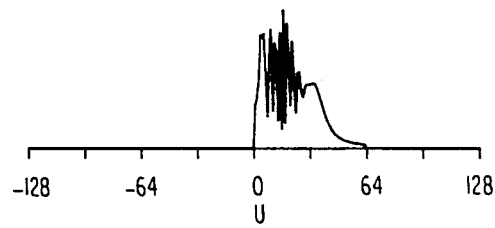
Figure 4E:
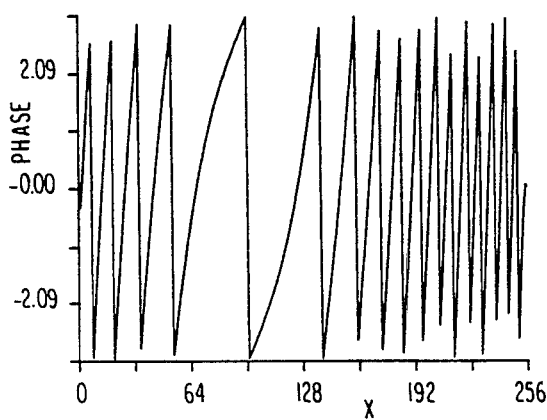
Figure 4F:
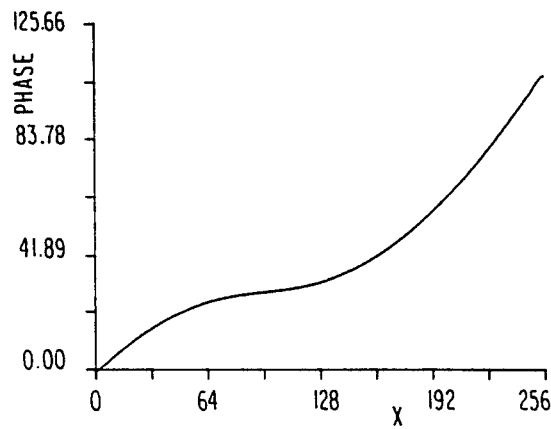

An example for nonmonotonic phase distribution is shown in FIG. 4a, which leads to the intensity distribution in FIG. 4b. Phase unwrapping according to Eqs. (7) leads to the continuous phase distribution shown in FIG. 4f, which differs from the original one in FIG. 4a.

A method for reliable detection of an inversion of the phase-variation direction is based on two reconstructions of the holographic interference pattern with a mutal phase shift $\alpha$, $\alpha < \pi$ in the reference wave. Then there are two intensity distributions:

$$\begin{aligned} i_1(x,y) &= a(x,y) + b(x,y)\cos[\phi(x,y)], \\ i_2(x,y) &= a(x,y) + b(x,y)\cos[\phi(x,y) + \alpha]. \end{aligned} \quad (8)$$

Proceeding twice as described in Eqs. (3)-(5), one obtains $$\begin{aligned} c_1(x,y) &= \tfrac{1}{2}b(x,y)\exp[j\phi(x,y)], \\ c_2(x,y) &= \tfrac{1}{2}b(x,y)\exp[j\phi(x,y) + j\alpha(x,y)]. \end{aligned} \quad (9)$$

From Eqs. (9) the phase shift is determined by $$\alpha(x,y) = \arctan \frac{Rec_1 Imc_2 - Imc_1 Rec_2}{Rec_1 Rec_2 + Imc_1 Imc_2} \quad (10)$$

$\alpha(x, y)$ should be constant by definition, but a spatial variation in the $\alpha(x, y)$ calculated pointwise by Eq. (10) is due to disturbances in the recorded intensity distributions $i_1$ and $i_2$. Nevertheless, only the sign of $\alpha(x, y)$ is of interest. Where it is negative, the phase that resulted in Eq. (6) must be multiplied by $-1$.

Figure 5A:
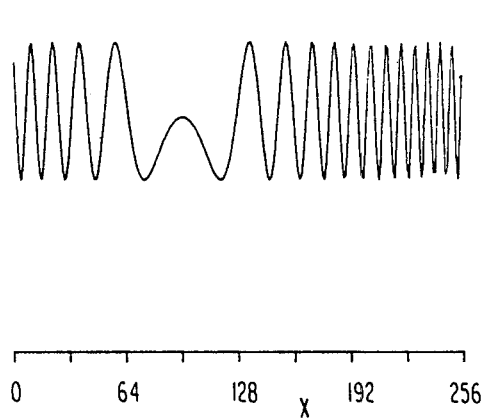
FIGS. 5a-f are diagrams showing the following stages in yet another example of interference phase determination.
Figure 5B:
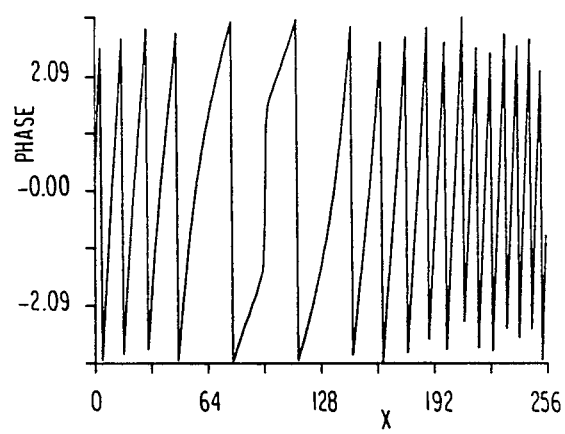
Figure 5C:
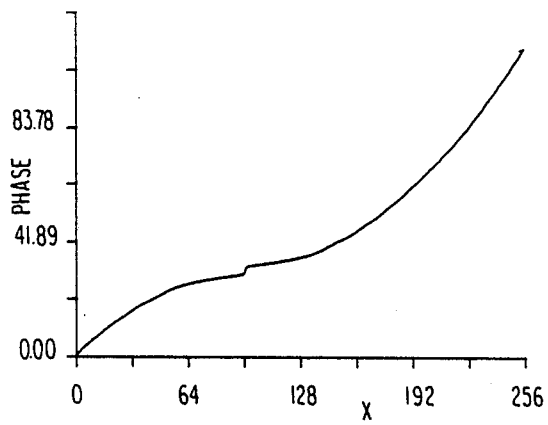
Figure 5D:
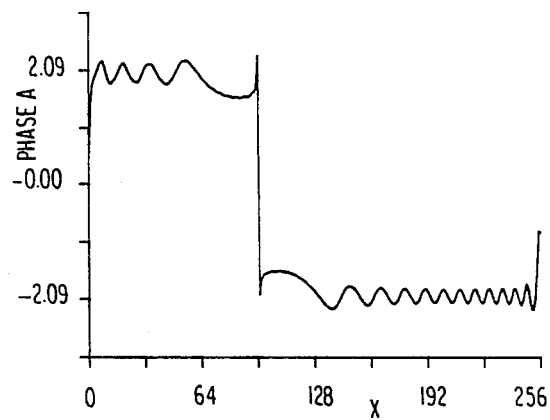
Figure 5E:
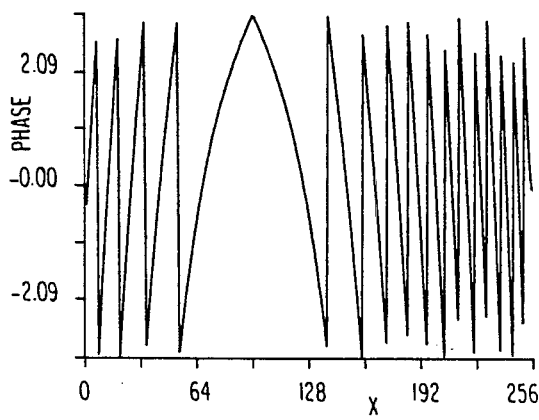
Figure 5F:
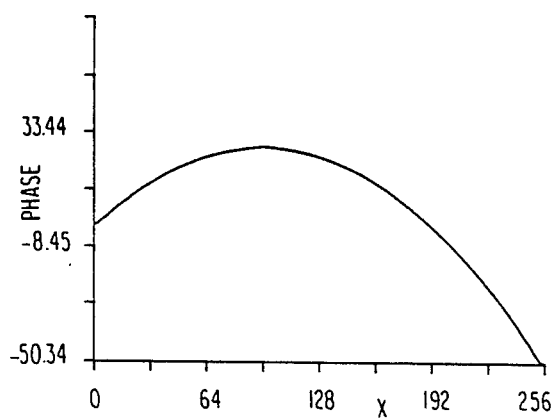

The phase distribution of FIG. 4a reconstructed with an additional phase shift leads to the intensity distribution shown in FIG. 5a, the phase modulo $2\pi$ drawn from it is shown in FIG. 5b, and the continuous phase according to Eqs. (7) is seen in FIG. 5c. The additional phase shift calculated from the intensities of FIG. 4b and FIG. 5a by Eqs. (9) and (10) is shown in FIG. 5d. The sign-corrected phase is given in FIG. 5e; from this the continuous phase of FIG. 5f is determined by the recurrence procedure $$n(x_1) = 0, \quad (11)$$

$$n(x_i) = \begin{cases} n(x_{i-1}) & \text{if } |\phi(x_i) - \phi(x_{i-1})| < \pi \\ n_{(i-1)} + 1 & \text{if } \phi(x_i) - \phi(x_{i-1}) \leq -\pi, \\ n(x_{i-1}) - 1 & \text{if } \phi(x_i) - \phi(x_{i-1}) \geq \pi \end{cases}$$

$$i = 2, 3, \ldots,$$

$$\phi_{contin}(x_i) = \phi(x_i) + 2\pi n(x_i), i = 1, 2, \ldots$$

Here one has to recognize the additional discontinuity at the inversion point in FIG. 5b. The limits on the right and left sides of the point have the same modulus; this discontinuity can be removed by a change in the sign. But no general procedure for detection of sign inversions can be based on this effect, as is shown by FIG. 4a. The discontinuity results from the fact that the negative spatial frequencies have been filtered out in the Fourier space, so one gets only increasing phases from Eq. (6).

Phase Unwrapping in Two Dimensions

To make full use of all the information contained in the whole interferogram, one should perform a two-dimensional evaluation according to Eq. (5c). In the two-dimensional case there are several possibilities for choosing the bandpass filter in the Fourier plane. With a passband in the $+u$ half-plane, filtering out the negative spatial-frequency components in the horizontal direction while letting the negative and the positive spatial-frequency components in the vertical direction (the v direction in the Fourier plane) pass through, a phase distribution in the intensity plane results that only increases in the horizontal (x) direction but increases and decreases in the vertical (y) direction. On the other hand, if one chooses a filter with a passband in the $+v$ half of the Fourier plane, an increasing phase in the vertical direction but increasing and decreasing phase distribution in the horizontal direction will result. So by application of two such filters a number of points are found where the sign of the phase direction changes.

Nevertheless, there still exist patterns for which this procedure does not succeed, for example, a pattern of parallel fringes with an intensity distribution identical to the one in FIG. 4b in a direction orthogonal to the fringes.

The best way to determine the sign change is to use two phase-shifted reconstructions as described for the phase-unwrapping procedure in the one-dimensional case. The correction of the $2\pi$ discontinuities now proceeds iteratively in the x and y-directions:

$$n(x_1, y_1) = 0, \quad (12)$$

$$n(x_1, y_i) = \begin{cases} n(x_1, y_{i-1}) & \text{if } |\phi(x_1, y_i) - \phi(x_1, y_{i-1})| < \pi \\ n(x_1, y_{i-1}) + 1 & \text{if } \phi(x_1, y_i) - \phi(x_1, y_{i-1}) \leq -\pi, \\ n(x_1, y_{i-1}) - 1 & \text{if } \phi(x_1, y_i) - \phi(x_1, y_{i-1}) \geq \pi \end{cases}$$

$$i = 2, 3, \ldots,$$

$$n(x_j, y_i) = \begin{cases} n(x_{j-1}, y_i) & \text{if } |\phi(x_j, y_i) - \phi(x_{j-1}, y_i)| < \pi \\ n(x_{j-1}, y_i) + 1 & \text{if } \phi(x_j, y_i) - \phi(x_{j-1}, y_i) \leq -\pi, \\ n(x_{j-1}, y_i) - 1 & \text{if } \phi(x_j, y_i) - \phi(x_{j-1}, y_i) \geq \pi \end{cases}$$

$$j = 2, 3, \ldots,$$

-continued $$n(x_j,y_i) = \begin{cases} n(x_{j+1},y_i) & \text{if } |\phi(x_j,y_i) - \phi(x_{j+1},y_i)| < \pi \\ n(x_{j+1},y_i) - 1 & \text{if } \phi(x_j,y_i) - \phi(x_{j+1},y_i) \geq -\pi, \\ n(x_{j+1},y_i) + 1 & \text{if } \phi(x_j,y_i) - \phi(x_{j+1},y_i) \leq \pi \end{cases}$$

$j = 1, 2, \ldots, 1-1$ $\phi_{contin}(x_j,y_i) = \phi(x_j,y_i) + 2\pi n(x_j,y_i),$
$i,j = 1, 2, \ldots$

RESULTS

The validity of the proposed method in the two-dimensional case has been investigated with the aid of a computer-generated holographic interference pattern that would result from measuring a rectangular plate under tensile stress and torsion. Additionally, a local continuous inhomogeneity, such as that resulting from a local defect in the structure, was simulated. Such an interference pattern is optimally suited for testing the evaluation method, since it contains all orientations of the fringes, varying fringe densities, and a nonmonotonic variation of fringe order in any direction.

Figure 6:
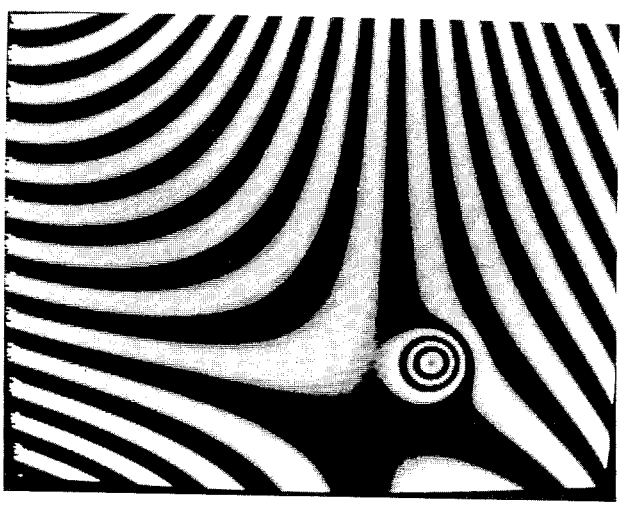
FIG. 6 illustrates a simulated test interferogram.

The intensities of this test interferogram have been calculated for an array of 256×256 pixels. A gray-scale monitor display of the interferogram is shown in FIG. 6.

Figure 7:
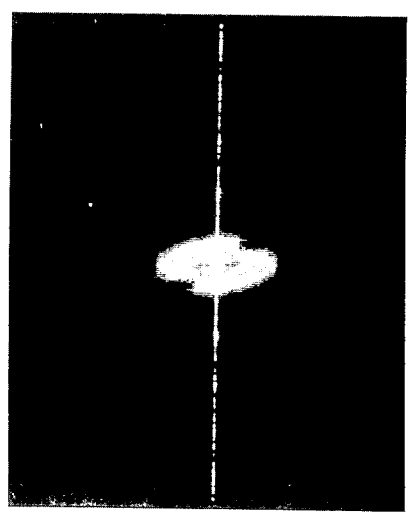
FIG. 7 illustrates the two-dimensional amplitude spectrum of the simulated test interferogram of FIG. 6.
Figure 8A:
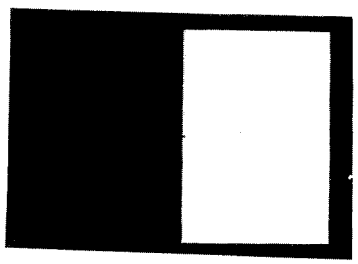
FIG. 8a illustrates a bandpass filter with passband in the $+\mu$ half-plane.
Figure 9A:
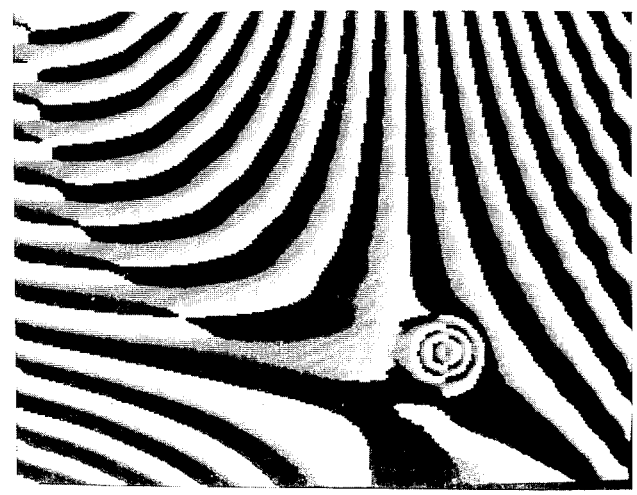
Figure 8B:
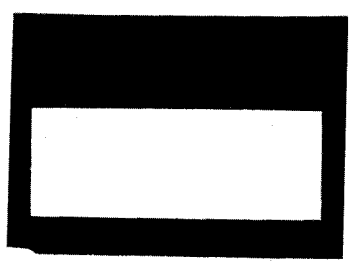
FIG. 8b illustrates a bandpass filter with passband in the $+\nu$ half-plane.
Figure 9B:
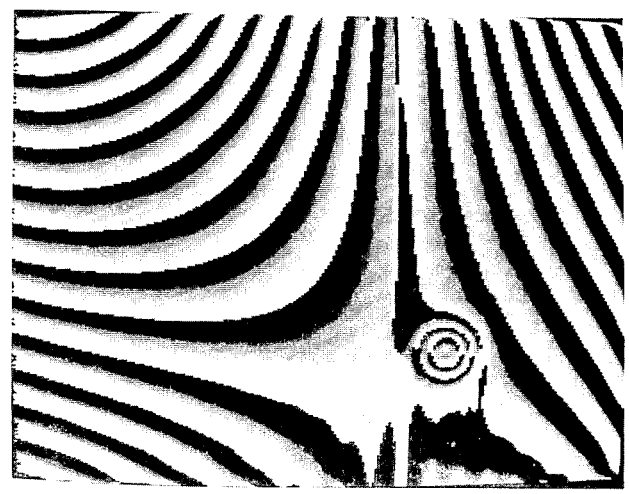
FIG. 9b illustrates the interference-phase distribution modulo $2\pi$ of the interferogram of FIG. 6, determined with the bandpass filter of FIG. 8b.

A two-dimensional Fourier-transform was performed by a fast-Fourier-transform algorithm, and the amplitude spectrum is shown in FIG. 7. A reordering of the spatial frequencies was carried out to place the zero-order term into the geometric center and a clipped magnitude display was chosen for clarity. Filtering was performed with the filters shown in FIG. 8, where the passbands are displayed in white, the stopbands in black. After inverse transformation, the two phase distributions with values ranging from $-\pi$ to $+\pi$ resulted. For display a linear mapping of the phases to gray values was performed, transforming $-\pi$ into black and $+\pi$ into white. The phases calculated with the filters of FIG. 8 are shown in FIG. 9. One must recognize the monotonic variation of phase in one direction and the nonmonotonic variation in the other direction when the $2\pi$ discontinuities are neglected. These directions change with the two different filters, as predicted above.

From these phase distributions the loci of sign inversions can be determined uniquely. Still on the basis of a single interferogram, the sign at one pixel must be chosen arbitrarily or by knowledge of the loading direction of the structure. When using two phase-shifted interferograms, one additionally gets the correct sign, provided that the phase shift is known to be less than $\pi$. The exact value of the phase shift does not need to be known.

Figure 10:
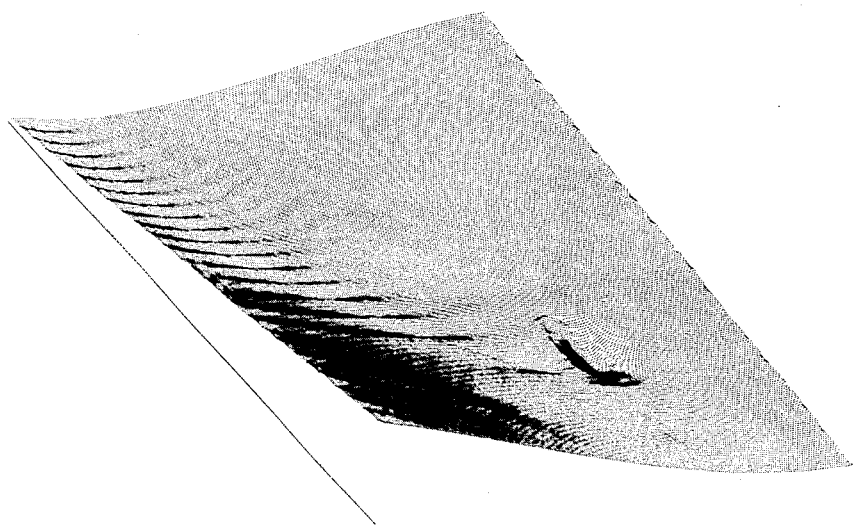
FIG. 10 illustrates a plot of the continuous interference-phase distribution.

Based on the calculated phase distribution, the continuous phase was reconstructed according to Eqs. (12); the result is shown in FIG. 10. Here the phase distribution of each line is plotted with a slightly shifted origin to give an impression of perspective.

Even with the application of phase-shifted interferograms, there is no way to determine the overall constant additive phase term. But a proper arrangement of the holographic setup results in a negligible variation of the sensitivity vector over the observed surface,[15] so, when taking derivations in the displacement field to calculate strains and stresses the unknown constant is no longer needed. Otherwise one has to consider this fact when arranging the holographic setup, putting strips between the surface to be measured and a part without motion, or using a comparable method.

In addition to aforementioned investigation with the aid of a computer-generated holographic interference pattern, the method has been applied to the investigation of a composite panel, consisting of an internal honeycomb structure of aluminum and a surface layer fabricated of carbon-fiber reinforced plastic. The whole structure was thermally loaded. A hologram was made at raised temperature after heating, the interference pattern was produced with the real-time method by comparing the holographic reconstruction with the structure itself after cooling down.

Figure 12:
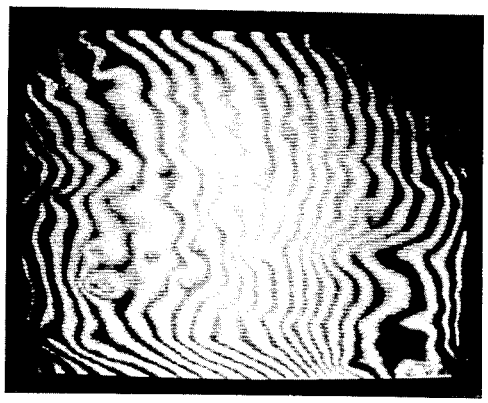
FIG. 12 is the holographic interference pattern of a composite panel.
Figure 13:
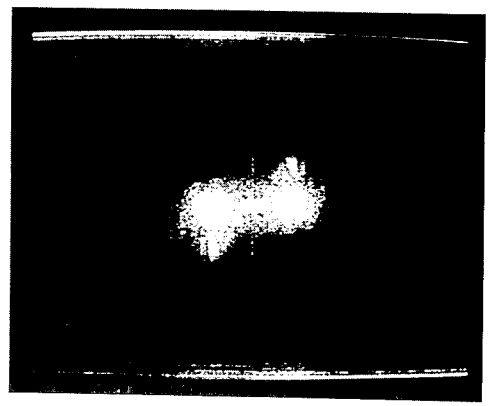
FIG. 13 is the amplitude spectrum of the holographic interference pattern of FIG. 12.
Figure 14:
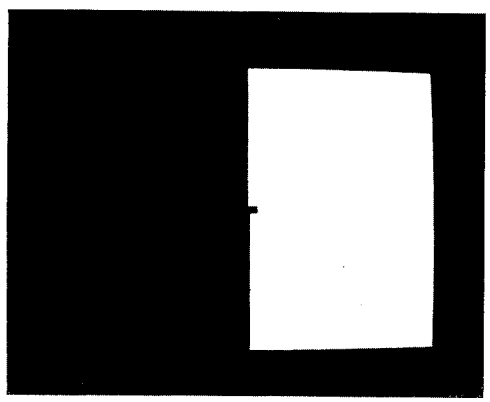
FIG. 14 is a band pass filter applied to the amplitude spectrum of FIG. 13.

FIG. 12 shows the monitor display of the holographic interference pattern to be evaluated, recorded by a CCD-camera, quantized into 256 gray-levels and digitized into 256×256 pixels. The amplitude spectrum of this pattern after the application of the 2D Fourier-transform is shown in FIG. 13 in a gray-scale display. The bandpass-filter to be applied in the spatial frequency domain is shown in FIG. 14, where the passband is displayed in white and the stopband in black.

Figure 15:
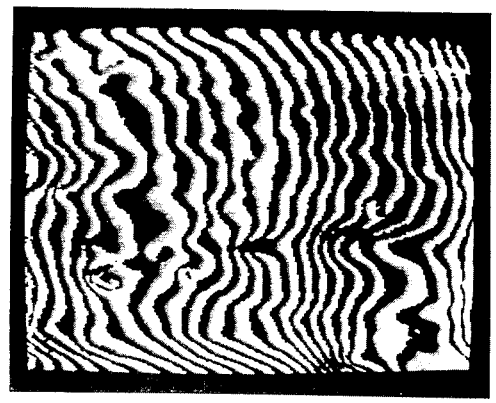
FIG. 15 is the interference phase modulo $2\pi$ after evaluating with an inverse Fourier-transform and complex logarithm operation.

The application of the inverse Fourier-transform and of the complex logarithm resulted in the interference phase modulo $2\pi$ of FIG. 15. Here the phase values are mapped linearly to gray-levels, with black corresponding to $-\pi$ and white corresponding to $+\pi$. Only increasing phases are observed in the horizontal direction, increasing as well as decresing phases occur in the vertical direction, as predicted from the orientation of the filter.

Figure 16:
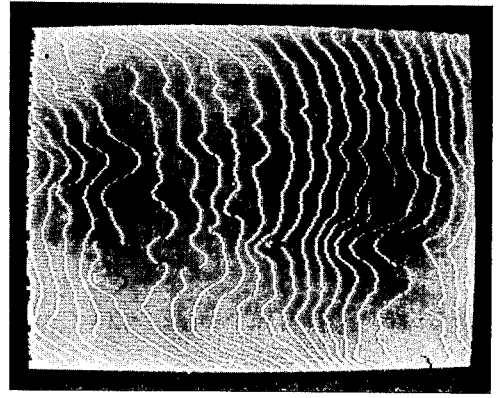
FIG. 16 is an illustration of the $2\pi$-discontinuities of the interference phase modulo of FIG. 15.

After sign correction by local multiplication with $-1$, the $2\pi$-discontinuities were removed. For a check, the points, where the additive constant n(x, y) of (12) changes by $2\pi$, are displayed, FIG. 16. The white pixels correspond to an increase by $2\pi$, the black pixels correspond to a decrease by $2\pi$. The gray pixels indicate that the interference phase modulo $2\pi$ is already continuous at this point.

Figure 17:
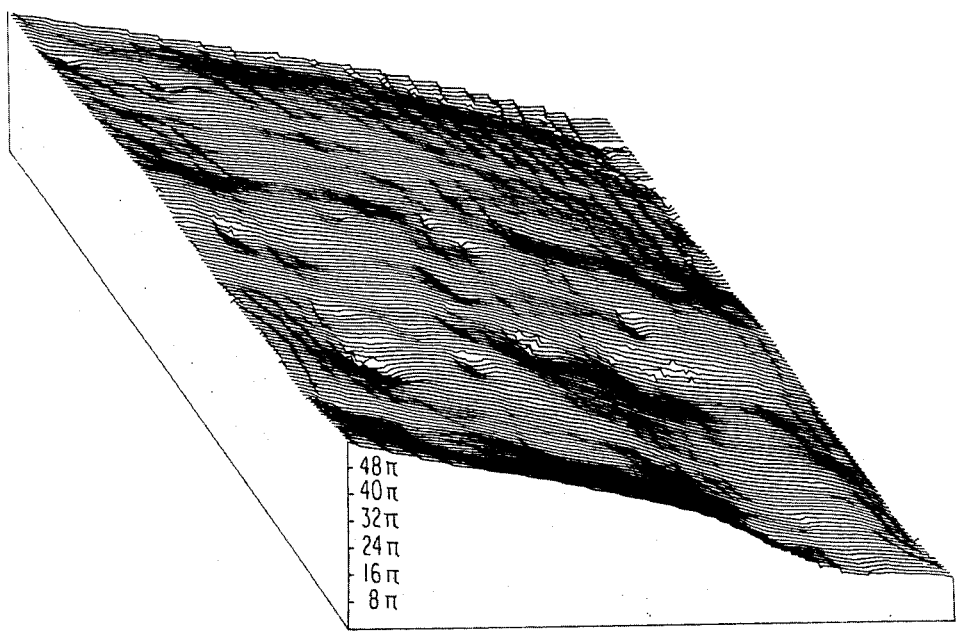
FIG. 17 is the calculated interference phase distribution which has been plotted line by line with slightly shifted origins to produce a perspective effect.

The calculated intereference phase distribution has been plotted line by line with slightly shifted origins to produce a perspective effect, FIG. 17. Due to the nearly constant sensitivity vectors of the specific holographic arrangement used, this phase distribution is to a good approximation proportional to the normal displacement field.

CONCLUSIONS

A Fourier-transform method for determination of the phase distribution from holographic interference patterns has been proposed and verified by computer experiments and by actual experimentation. This method has advantages over conventional methods for evaluating holographic interferograms that locate fringe maxima and minima, since it pointwisely calculates the phases even between the fringe extrema, and even in the sub-wave length range from one single interferogram. It makes full use of all intensities in calculating each spatial frequency and uses all spatial-frequency components in calculating the phase at each pixel. In this way the method may be interpreted as a cosine-fitting procedure. Distortions, such as background variation and speckle noise, may be filtered out. When the cosine of the determined phase distribution is taken, the effect of an enhancement of the originally low-quality interferogram may be displayed.

The method determines phase variations in the sub-wavelength range and also detects nonmonotonic fringe-order variations in most cases from only a single interference pattern. When two reconstructions are used for detection of local fringe-order extrema, a reference-beam phase shift is used, and it is not necessary to know or to control the exact phase shift.

In contrast to interferogram analysis techniques using frequency-domain approaches,[12-14] here no additional carrier frequency by mechanical or optical means has to be introduced and compensated for by a frequency shift in the spatial-frequency domain.

The method is particularly suitable for automatic evaluation by digital computers of holographic interference patterns that are produced by double-exposure or real-time techniques. Because of the method's high accuracy, stresses, strains, or bending moments may be calculated in subsequent procedures on the same computer system.

Furthermore, the method can be used in other applications dealing with images formed by cosine or cosine-related fringes, such as nonholographic interferometry, speckle interferometry, speckle photography, and moiré topography.

REFERENCES

1. R. J. Pryputniewicz and K. A. Stetson, "Holographic strain analysis: extension of fringe vector method to include perspective," Appl. Opt. 15, 725-728 (1976).
2. R. J. Pryputniewicz, "Holographic strain analysis: an experimental implementation of the fringe vector theory," Appl. Opt. 17, 3613-3618 (1978).
3. H. Kreitlow and Th. Kreis, "Entwicklung eines Geratesystems zur automatisierten statischen und dyanmischen Auswertung holografischer Interferenzumuster," in Proceedings of the Laser '79 Optoelectronics Conference (IPC Science and Technology, Guildford, UK, 1979), pp. 426-436.
4. W. Juptner, "Automatisierte Auswertung holografischer Interferogramme mit dem Zeilen-Scan-Verfahren," presented at the DPG/DGaO-Fruhjahrsschule, Holografische Interferometrie in Technik and Medizin, Hannover, Apr. 4-7, 1978).
5. W. Juptner, Th. Kreis, and H. Kreitlow, "Automatic evaluation of holographic interferograms by reference beam phase shifting," Proc. Soc. Photo-Opt. Instrum. Eng. 398, 22-29 (1983).
6. Th. Kreis, B. Fischer, W. Juptner, and G. Sepold, "Automatisierte Auswertung holografischer Interferenzumuster bei der Untersucuhung von Zugproben," in Proceedings of the Laser '81 Optoelectronics Conference (Springer-Verlag, Berlin, 1981), pp. 105-110.
7. P. Hariharan, B. F. Oreb, and N. Brown, "Real-time holographic interferometry; a microcomputer system for the measurement of vector displacement," Appl. Opt. 22, 876-880 (1983).
8. D. Dandliker, R. Thalmann, and J.-F. Willemin, "Fringe interpolation by two-reference-beam holographic interferometry: reducing sensitivity to hologram misalignment," Opt. Commun. 42, 301-306 (1982).
9. J. B. Schemm and C. M. Vest, "Fringe pattern recognition and interpolation using nonlinear regression analysis," Appl. Opt. 22, 2850-2853 (1983).
10. Th. Kreis and H. Kreitlow, "Quantitative evaluation of holographic interference patterns under image processing aspects," Proc. Soc. Photo-Opt. Instrum. Eng. 210, 196-202 (1979).
11. The Kreis and H. Kreitlow, "Digital processing of holographic interference patterns," in Digest of Topical Meeting on Holographic Interferometry and Speckle Metrology (Optical Society of America, Washington, D.C., 1980).
12. M. Takeda, H. Ina, and S. Kobayashi, "Fourier-transform method of fringe-pattern analysis for computer-based topography and interferometry, "J. Opt. Soc. Am 72, 156-160 (1982).
13. W. W. Macy, Jr., "Two-dimensional fringe-pattern anaysis," App. Opt. 22, 3898-3901 (1983).
14. K. H. Womack, "Interferometric phase measurement using spatial synchronous detection," Opt. Eng. 23, 391-395 (1984).
15. W. Juptner, K. Ringer, and H. Welling, "Auswertung von Interferenzstreifensystemen bei holografischer Translations- und Dehnungsmessung," Optik 38, 437-448 (1973).
16. Abramson, N.: The Making and Evaluation of Holograms, Academic Press, 1982.
17. Schumann, W., Dubas, M.: Holographic Interferometry, From the Scope of Deformation Analysis of Opaque Bodies. Springer-Verlag, 1979.
18. Kreis, Th.: Answertung holografischer Interferenzumuster mit Methoden der Ortsfrequenzanalyse. Fortschritt-Berichte VDI, Reihe 8, Nr. 108, VDI-Verlag, Dusseldorf, 1986.

What is claimed is:

1. A method for processing a cosine-related fringe pattern using Fourier transforms, said method comprising the steps of:

digitizing a cosine-related fringe pattern by measuring point data at a plurality of points, the data for each point having an intensity value associated with coordinate values, and the intensity distribution of the fringe pattern being defined by the formula:

$$i(x,y) = a(x,y) + b(x,y) \cos[\phi(x,y)]$$

where $a(x,y)$ describes background variation and carries additive disturbances, $b(x,y)$ is related to the local contrast of the pattern and carries the multiplicative disturbances, and $\phi(x,y)$ is the phase;

said formula being rewritten as the formula:

$$i(x,y) = a(x,y) + c(x,y) + c^*(x,y)$$

where $c(x,y) = \frac{1}{2} b(x,y) \exp[j\phi(x,y)]$, $j = \sqrt{-1}$ and $*$ denotes the complex conjugate;

processing said point data in accordance with said rewritten intensity distribution formula and a Fourier transform operation to produce an amplitude spectrum having a trimodal function of the form:

$$I(u,v) = A(u,v) + C(u,v) + C^*(u,v),$$

wherein $A(u,v)$ corresponds to a reference modal function, and $C(u,v)$ and $C^*(u,v)$ represents modal functions which are symmetrical about $A(u,v)$;

removing processed data corresponding to the A(u,v) portion and one of the C(u,v) and C*(u,v) portions of the trimodal function;

performing an inverse Fourier transform operation on the processed data corresponding to the remaining portion of the trimodal function to obtain a value for c(x,y); and calculating the phase $\phi(x,y)$ for each point by using the formula:

$$\phi(x,y) = \frac{Im[c(x,y)]}{Re[c(x,y)]}$$

where Re denotes the real part and Im the imaginary part.

2. A method as claimed in claim 1, wherein background variations, speckle noise, and other unwanted disturbances are removed by the additional step of:
after the removing step and before the performing step, further removing any processed data not corresponding to the remaining portion of the trimodal function.

3. A method as claimed in claim 1, further comprising the step of:
using a recurrence procedure to perform phase unwrapping to convert the calculated phases to a continuous phase.

4. A method as claimed in claim 1, further comprising the step of:
converting to a processed intensity distribution by deriving the cosine of the calculated phases.

5. A method as claimed in claim 1, wherein the cosine-related fringe pattern is an interference pattern.

6. A method as claimed in claim 5, wherein the phase $\phi(x,y)$ is an interference phase of said interference pattern.

7. A method as claimed in claim 1, wherein the cosine-related fringe pattern is a holographic interference pattern.

8. A method as claimed in claim 1, wherein the cosine-related fringe pattern is a speckle interferometry pattern.

9. A method as claimed in claim 1, wherein the cosine-related fringe pattern is a speckle photography pattern.

10. A method as claimed in claim 1, wherein the cosine-related fringe pattern is a moiré topography pattern.

11. A method for processing a cosine-related fringe pattern using Fourier transforms, said method comprising the steps of:
digitizing a cosine-related fringe pattern by measuring point data at a plurality of points, the data for each point having an intensity value associated with coordinate values, wherein said point data is characterized by a first intensity distribution and a second phase-shifted intensity distribution, the first intensity distribution being characterized by a first formula:

$$i_1(x,y) = a(x,y) + b(x,y) \cos[\phi(x,y)]$$

where a(x,y) describes the background variation and carries the additive disturbances, b(x,y) is related to the local contrast of the pattern and carries the multiplicative disturbances, and $\phi(x,y)$ is the phase;

said formula being rewritten as the formula:

$$i_1(x,y) = a(x,y) + c_1(x,y) + c_1^*(x,y)$$

where $c_1(x,y) = \tfrac{1}{2}b(x,y) \exp[j\phi(x,y)]$, $j=\sqrt{-1}$ and * denotes the complex conjugate; and the second intensity distribution being characterized by a second formula:

$$i_2(x,y) = a(x,y) + b(x,y) \cos[\phi(x,y) + \alpha]$$

where a(x,y) describes the background variation and carries the additive disturbances, b(x,y) is related to the local contrast of the pattern and carries the multiplicative disturbances, $\phi(x,y)$ is the phase, and $\alpha$ is a phase shift;

said formula being rewritten as the formula:

$$i_2(x,y) = a(x,y) + c_2(x,y) + c_2^*(x,y)$$

where $c_2(x,y) = \tfrac{1}{2}b(x,y) \exp[j\phi(x,y) + j\alpha(x,y)]$, $j=\sqrt{-1}$ and * denotes the complex conjugate;

processing said point data in accordance with said first rewritten intensity distribution formula and a Fourier transform operation to produce an amplitude spectrum having a trimodal function of the form:

$$I_1(u,v) = A(u,v) + C_1(u,v) + C_1^*(u,v),$$

wherein A(u,v) corresponds to a reference modal function, and $C_1(u,v)$ and $C_1^*(u,v)$ represent modal functions which are symmetrical about A(u,v);

removing processed data corresponding to the A(u,v) portion and one of the $C_1(u,v)$ and $C_1^*(u,v)$ portions of the trimodal function;

performing an inverse Fourier transform operation on the processed data corresponding to the remaining portion of the trimodal function to obtain a value for $c_1(x,y)$;

processing said point data in accordance with said second rewritten intensity distribution formula and a Fourier transform operation to produce an amplitude spectrum having a trimodal function of the form:

$$I_2(u,v) = A(u,v) + C_2(u,v) + C_2^*(u,v),$$

wherein A(u,v) corresponds to a reference modal function, and $C_2(u,v)$ and $C_2^*(u,v)$ represent modal functions which are symmetrical about A(u,v);

removing processed data corresponding to the A(u,v) portion and one of the $C_2(u,v)$ and $C_2^*(u,v)$ portions of the trimodal function;

performing an inverse Fourier transform operation on the processed data corresponding to the remaining portion of the trimodal function to obtain a value for $c_2(x,y)$;

calculating the phase shift $\alpha(x,y)$ for each point using the formula:

$$\alpha(x,y) = \arctan \frac{Re\ c_1\ Im\ c_2 - Im\ c_1\ Re\ c_2}{Re\ c_1\ Re\ c_2 + Im\ c_1\ Im\ c_2}$$

where Re denotes the real part and Im the imaginary part; and calculating the sign corrected phase $\phi(x,y)$ for each point using said value for one of said $c_1(x,y)$ and $c_2(x,y)$, and the sign of the calculated phase shift in the formula:

$$\phi(x,y) = [\text{sgn } \alpha(x,y)] \arctan \frac{Im[c(x,y)]}{Re[c(x,y)]}$$

where Re denotes the real part and Im the imaginary part, and sgn $\alpha(x,y)$ denotes the sign of the calculated phase shift.

12. A method as claimed in claim 11, wherein background variations, speckle noise, and other unwanted disturbances are removed by the additional step of:

after each removing step and before the next subsequent performing step, further removing any processed data not corresponding to the remaining portion of the trimodal function.

13. A method as claimed in claim 11, further comprising the step of:

converting to a processed intensity distribution by deriving the cosine of the calculated phases.

14. A method as claimed in claim 11, wherein the cosine-related fringe pattern is an interference pattern.

15. A method as claimed in claim 14, wherein the phase $\phi(x,y)$ is an interference phase of said interference pattern.

16. A method as claimed in claim 11, wherein the cosine-related fringe pattern is a holographic interference pattern.

17. A method as claimed in claim 11, wherein the cosine-related fringe pattern is a speckle interferometry pattern.

18. A method as claimed in claim 11, wherein the cosine-related fringe pattern is a speckle photography pattern.

19. A method as claimed in claim 11, wherein the cosine-related fringe pattern is a moiré topography pattern.

* * * * *

UNITED STATES PATENT AND TRADEMARK OFFICE
CERTIFICATE OF CORRECTION

PATENT NO. : 4,768,881

DATED : September 6, 1988

INVENTOR(S) : Werner Juptner and Thomas Kreis

It is certified that error appears in the above-identified patent and that said Letters Patent is hereby corrected as shown below:

Title page:

[73] Assignee: BIAS Forschungs- und Entwicklungslabor fur angewandte Strahltechnik GmbH
Ermlandstrasse 59,
D - 2820, Bremen 71, West Germany Signed and Sealed this Twenty-first Day of March, 1989

Attest:

DONALD J. QUIGG

Attesting Officer

Commissioner of Patents and Trademarks